MAGNETIC TAPE RECORDER WITH RECESSED CONCAVE TAPE GUIDE

Original Filed May 27, 1952 4 Sheets-Sheet 1

INVENTOR
LEONARD DODGE BARRY

INVENTOR
LEONARD DODGE BARRY

INVENTOR
LEONARD DODGE BARRY

INVENTOR
LEONARD DODGE BARRY 3,320,370
Patented May 16, 1967

3,320,370

MAGNETIC TAPE RECORDER WITH RECESSED CONCAVE TAPE GUIDE

Leonard Dodge Barry, Detroit, Mich., assignor to Ampex Corporation, Redwood City, Calif., a corporation of California Continuation of application Ser. No. 78,348, Dec. 27, 1960, which is a division of application Ser. No. 292,013, May 27, 1952. This application Nov. 27, 1962, Ser. No. 240,284
2 Claims. (Cl. 179—100.2)

This application is a continuation of my co-pending application Ser. No. 78,348, filed Dec. 27, 1960, now abandoned, which is a division of application Ser. No. 292,013, filed May 27, 1952, now abandoned.

This invention relates to tape recorders and in particular to a method and means for recording and reproducing signals for television pictures, sound, and other information.

Magnetic tape recorders have long been made for recording sound and information with accompanying efforts to improve the magnetic medium and thereby lower the tape speed or increase the audio frequency response at a given speed. By providing a recorder which transversely scans the tape together with special circuits for recording and reproducing over a wide frequency range this improved tape recorder is not only suitable to apply the required audio frequencies to the tape at a much lower tape speed, but it is also designed for recording video signals which have a frequency range of about 0 to 4 mc. with a linear velocity of tape comparable to present sound tapes.

One object of this invention is to provide a tape recorder for video signals by which these signals can be picked up in a television receiver, recorded, and reproduced from the record as often as desired to be played back on a television picture tube.

A second object is to provide a system of scanning a tape to enable more information to be recorded on a given length of tape.

A third object is to provide a combination sound and video magnetic tape recorder.

A fourth object is to provide a recording system for video which minimizes critical adjustment, is simple to operate, is conveniently sized, and has tolerances and design suitable for manufacture.

A fifth object is to provide a television recorder which does not interfere with the viewing of the television program on the picture tube of the television set from which the video signal is being recorded.

Other objects have been taken into consideration within the limits of this invention resulting in further improvements in the art of tape recording disclosed herein.

The development of this invention required consideration of several problems.

In accordance with present standards the frequency required to be passed in a video amplifier is 0–4,000,000 cycles/sec. for a high quality picture. A good picture can be produced with 30–3,600,000 cycles, and the more limited the frequency range the poorer the resolution of the picture.

The present magnetic recording media have a good level output from 20 to about 5000 cycles at 3.75″/sec. The output volume is equalized by circuits to give a practically flat response in this range. Using a figure of 5000 cycles at 3.75″/sec. present day tape will record 1333 cycles/inch. The frequency response is directly proportional to the speed. To record video on tape or wire to include 4 mc. would take 4 mc./1333=3000″ of medium/sec.

As a feature of this invention a rotary wheel or disk is provided having recording heads thereon appropriately spaced to scan the tape crosswise for recording and pickup at a peripheral speed of approximately 3000″/sec. The tape is curved to conform to the contour of the wheel.

Keeping the size suitable for portability the following example is given to show the relations of dimensions and speeds. Calculations are based on accepted television standards providing for interlaced scanning 30 frames/sec., 525 lines/frame, and 0–4 mc. video frequency response.

The frequency response required of each horizontal video line is:

$$\frac{4,000,000 \text{ cy./sec.}}{525 \text{ lines/frames} \times 30 \text{ frames/sec.}} = 254 \text{ cy./line}$$

Recording at high speed the tape should still take 1333 cy./inch.

Then the tape width required for each horizontal line and retrace is:

$$\frac{254 \text{ cy./line}}{1333 \text{ cy./inch}} = 0.191''\text{/line}$$

A wider tape per horizontal video line requires a higher peripheral velocity for scanning but would give a better frequency response and a higher output if needed. A narrower video track would give a lower frequency response and output level, but the peripheral velocity would be less. Allowance for overlap and other factors mentioned later requires a wider tape than the line of signal to be reproduced.

Selecting 8″ as the diameter for the wheel the spacing of the magnetic heads around the periphery=0.191″.

The retrace takes (0.16 to 0.18)×picture width of video track.

Then picture width=P.W.—0.191—0.17×P.W.

$$1.17 \times \text{P.W.} = 0.191$$
$$\text{P.W.} = 0.163''$$

The tolerance is ±0.01×0.163=±0.0016″. This is within standard practice and is the tolerance of variation for spacing the heads around the wheel.

The number of heads=8×3.1416/0.191=132 heads.

Increasing the width of the tape to include eight horizontal video lines, the number of heads is reduced to sixteen with a slight increase in diameter.

The r.p.m. of the wheel=

$$525 \times 30 \times 60/(8 \times 16) = 7390 \text{ r.p.m.}$$

To reduce the r.p.m. to 5000 then requires a different number of heads and a larger diameter for equal clarity under given conditions.

Number of heads=

$$525 \times 30 \times 60/(8 \times 5000) = 23.6 \approx 24 \text{ heads.}$$

$$\text{Diameter} = 24 \times 0.191 \times 8/3.1416 = 11.67''.$$

Using ring-type heads with a 0.0005″ gap a width of 0.01″ should be sufficient for the pole tips and approximately equal to the width of line recorded. With a 0.01″ spacing between lines to prevent demagnitization where the picture has changed the linear space/line totals 0.02″.

The linear speed of tape=525×30×0.02/8=39.4″/sec.

This is faster than required for sound recording, and can be reduced if a narrower pole piece or little or no spacing between lines is found to produce a satisfactory picture. The spacing between lines is not considered a necessity and would not be used if only one horizontal video line was recorded per recorded line across the tape width since, the lines if aligned properly would build up a field of picture as the cathoderay does on the tube. The succeeding fields would not be interlaced on the recording but would be interlaced by the picture tube.

It should be understood that any improvement in the frequency response of the tape or magnetic heads over present standards would improve the picture reproduced, or reduce the r.p.m. or diameter of the wheel for a given quality of picture, and improve the sizing and speed of the tape and associated parts.

Figure 1:
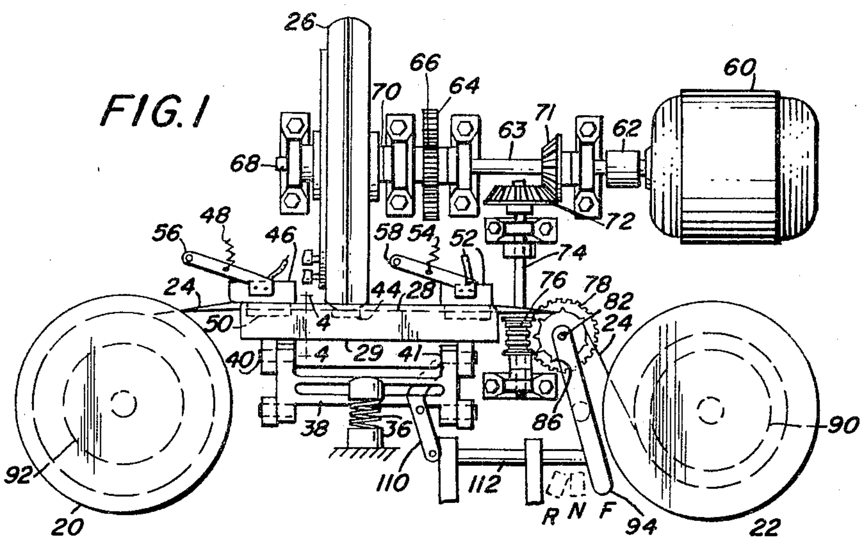
FIGURE 1 is a top plan view of the improved tape recording mechanism, the enclosure and electrical circuits being removed.
Figure 2:
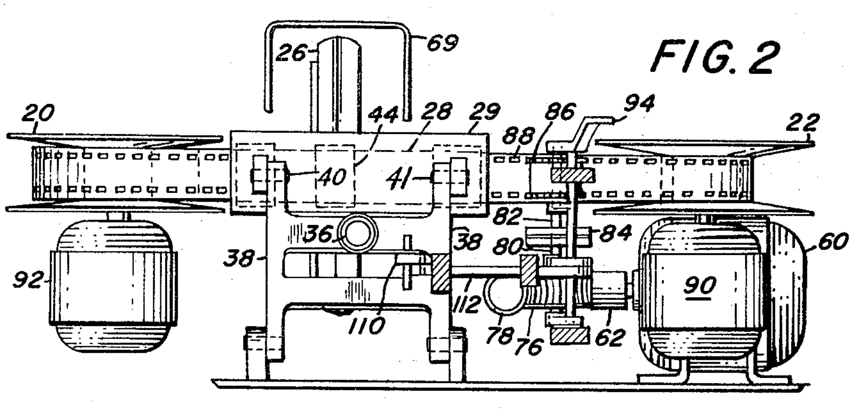
FIGURE 2 is a front elevation of the recorder shown in FIGURE 1.
Figure 4:
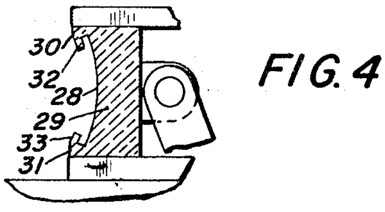
FIGURE 4 is an enlarged section view of the tape guide assembly taken on line 4—4 in FIGURE 1.

Referring to the drawings and in particular to FIGURES 1 and 2, 20 is a supply reel and 22 is a take-up reel for magnetic tape 24, which as seen from FIGURE 1 is inserted between wheel 26 and groove 28 of guide 29. Guide 29 as seen in cross section in FIGURE 4 has retaining sides 30 and 31 and edge covers 32 and 33 which hold the tape on both sides of wheel 26 so that the tape will not leave the groove 28 by friction of wheel 26 when rotating against the tape. Guide 29 holds the tape against the periphery of wheel 26, groove 28 being curved to the radius of the wheel, and guide 29 exerts a light force against the wheel by spring 36 and pivot bar member 38 which being pivoted at two points 40 and 41 in line hold the guide 29 against wheel 26 substantially parallel to the axis of the wheel. Guide 29 has an inserted cushioning pad or gap 44 at the line of contact of the wheel and guide so that when the tape is inserted by pushing guide 29 away from the wheel the tape will have a slight give in contact with the wheel which will save the tape from excessive wear and provide close even contact.

An erasing head 46 bears on the tape 24 along groove 28 ahead of the wheel. Spring 48 furnishes the required pressure, and pad 50 insures good contact. Head 46 covers the full width of magnetic media.

A sound recording head 52 bears on tape 24 after it passes the wheel. The head magnets are just wide enough to cover the sound track on the tape. Spring 54 provides the desired contact pressure.

The erase and record heads are each supported by pivoted arms 56 and 58 respectively. The heads are curved to fit groove 28 and help hold the tape in the groove and steady it. The design principles of the heads are similar to any used for sound erase or recording. A.C. erase is not objectionable because slight variations in the tapes longitudinal magnetism will not effect transverse scanning. The sound could be put on over the whole video track if desired as long as the tilt of the sound recording head is adjusted to the slant of the transverse scanning and the proper biasing and limiting of the amplitude of the signals is used.

Wheel 26 is driven by constant speed motor 60 through coupling 62, shaft 63, spur gear 64 engaging spur gear 66, shaft 68 to which wheel 26 is fixed. Gears 64 and 66 increase the speed to shaft 68. Gear 64 is preferably a fiber gear as should one of every gear set to reduce noise and vibration. Guard 69 encloses most of wheel 26. Spring washer 70 prevents axial movement of wheel 26.

Tape 24 is driven by motor 60 through beveled gears 71 and 72, shaft 74, worm 76, worm gear 78 fixed on shaft 80 coupled to shaft 82 by a friction clutch 84, and sprocket tooth drive wheel 86 having teeth which engage holes 88 in tape 24. The tape is moved by this tape transport from left to right during record and playback at a speed having a fixed relationship to the r.p.m. of the wheel 26. Thereby recordings can be reproduced even with slight variation in motor speed.

The take-up reel is driven by its motor 90 during record and playback. The supply reel is driven at a relatively high speed for rewind by its motor 92. This practice is followed in some quality tape recorders.

Figure 3:
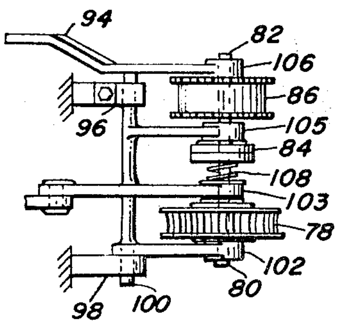
FIGURE 3 is an enlarged side elevation of the operating lever assembly in FIGURES 1 and 2.

Lever 94 provides means for the operator to shift from a neutral position N to either a position for record and playback F in which lever 94 is shown or a position for rewind R. FIGURE 3 shows the details of lever 94. This lever is pivoted about bearings 96 and 98 on shaft 100. The lever has four parallel arms extending to bearings 102 and 103 holding shaft 80 and bearings 105 and 106 holding shaft 82. Shaft 82 has the sprocket drive 86 fixed thereon. The friction clutch 84 held together by spring 108 permits slippage whenever worm gear 78 is engaged with worm 76 upon the operator moving lever 94 to position F or whenever the force to pull the tape exceeds a safe limit. The amount of slippage decreases until the tape gets up to speed.

When lever 94 is brought to positions N and R lever 110 moves guide 29 away from wheel 26 disengaging the tape from the wheel. Lever 110 is actuated by link 112 to lever 94 and bears on 38 in positions N and R.

Lever 94 also actuates switches, not shown, to control power to the reeling motors 90 and 92. The usual switching and safety features should be provided.

Figure 5:
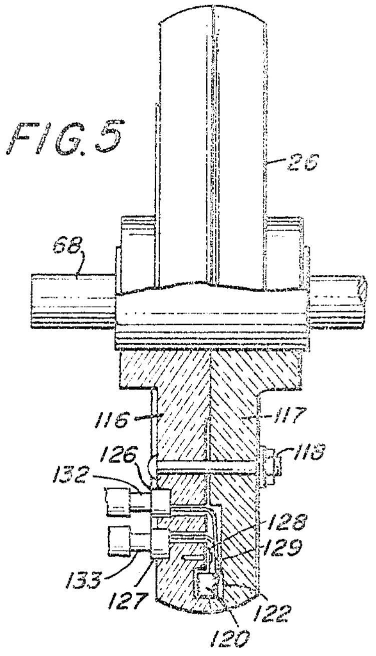
FIGURE 5 is an enlarged edge view of the wheel in FIGURES 1 and 2 part being broken away to show the coil connections to commutator segments and general construction.
Figure 6:
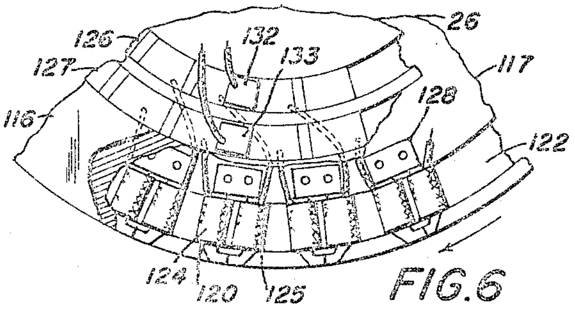
FIGURE 6 is a side view of a portion of the wheel shown in FIGURE 5 further enlarged and broken away to show details of the magnetic heads and segments.

Wheel 26, as seen in FIGURES 5 and 6, is composed of two nonmagnetic disks 116 and 117 bolted together with bolts 118. Disk 117 is brazed or otherwise secured to shaft 68. Recording-reproducing heads 120 are symmetrically spaced about the circumference of wheel 26 in a space 122 provided by grooving the adjoining faces of each disk. Each head has two coils 124 and 125. The two coils are connected series aiding and the ends brought to individual commutator segments arranged in two concentric rings 126 and 127 around the side of the disk 116. The coils are similar and similarly connected to the insulated segments so that any signal recorded or picked up will have the same polarity and value independent of which head recorded or picked it up. The cores 128 are in two parts to facilitate winding and are securely fastened to disk 116 by screws 129 through overlapping parts of the cores 128. Copper brushes 132 and 133 engage concentric rings 126 and 127 respectively to carry the signals between the coils and the recording-reproducing circuits. The commutator segments and brushes I prefer to call electrical switching means.

When in reproducing a head comes in or out of contact with the magnetic medium at the ends of the line being scanned the coils receive a voltage surge from any magnetization from the signal, bias, or erase that is present. This is not part of the signal to be picked up; it is a discontinuity which has caused this surge. Therefore the signal is recorded with enough overlap in scanning successive lines to provide for the period of this voltage surge to end before the coils are contacted by the brushes connecting them to the reproducing circuits. This is easily done by changing to a narrower set of brushes than were used for recording or by using separate coils and a commutator ring for pickup with brushes having the desired coverage. A slip ring could provide a common for one side of all coils. The recording should be made with sufficient overlap so that there will still be a slight amount of overlap with the narrower brushes to prevent an open circuit interruption of the signal.

Figure 7:
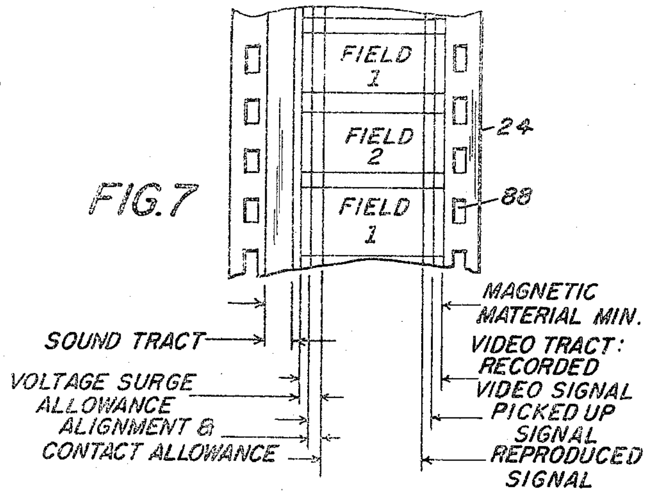
FIGURE 7 is a plan view of a piece of tape to show the sound and video magnetic track; portions thereof being labeled. The two fields of the picture are outlined and labeled thereon to show the sequence in which they are recorded.

FIGURE 7 shows the tape 24 as it would pass under the heads shown in FIGURE 6. The tape has a sound and a video track so labeled. Fields 1 and 2 follow in sequence and are composed of a suitable number of horizontal lines of video per line of width labeled REPRODUCED SIGNAL. To pick up this REPRODUCED SIGNAL the video track includes Alignment AND CONTACT ALLOWANCE that is an overlap provided for the distance required by the brushes to come from no contact to sufficient contact with the segments and allowance for tolerance in spacing heads, commutator segments, positioning of guide 29, and other variables. This overlap added at the entrance and exit of the REPRODUCED SIGNAL equals the PICKED UP SIGNAL. Adding VOLTAGE SURGE ALLOWANCE gives the required minimum RECORDED VIDEO SIGNAL per transverse line. The magnetic medium can be wider than this minimum width.

Figure 8:
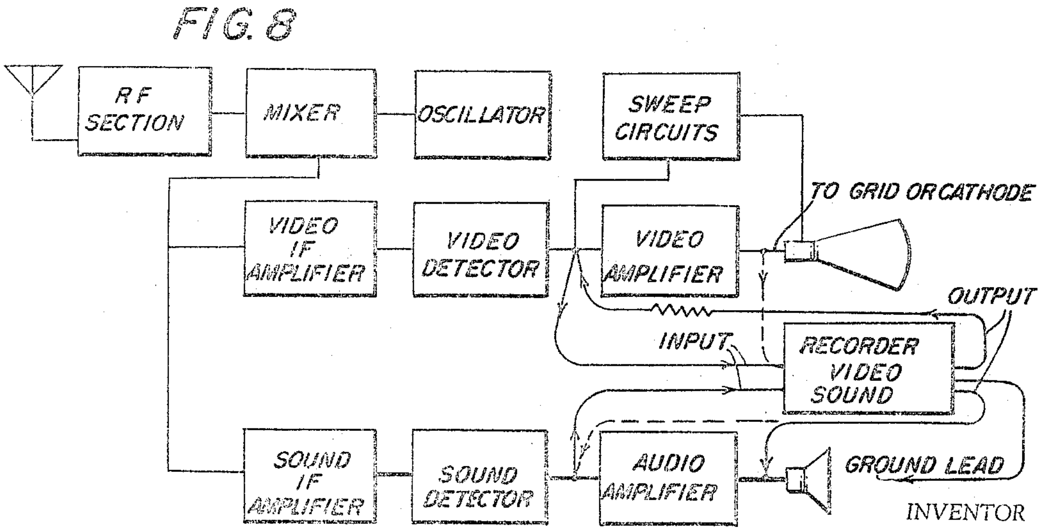
FIGURE 8 is a block diagram of a television receiver with a recorder connected thereto.
Figure 9:
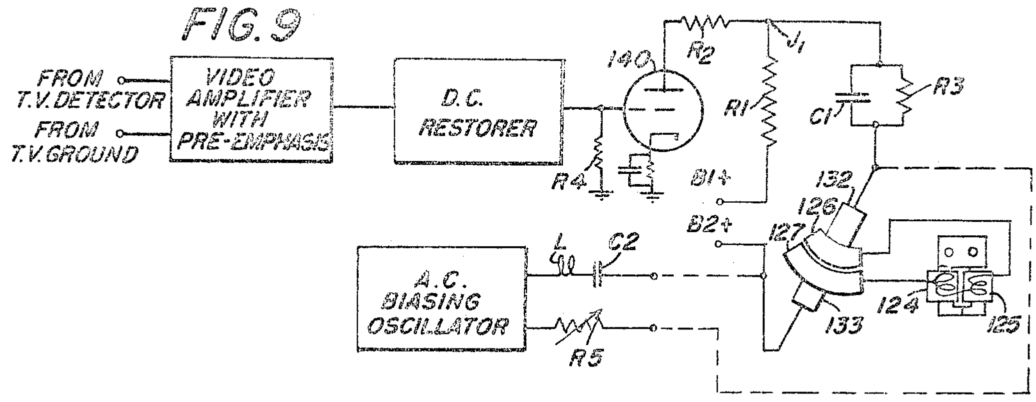
FIGURES 9 and 10 are combination block diagrams and electrical schematics of two variations of the recording circuits.
Figure 10:
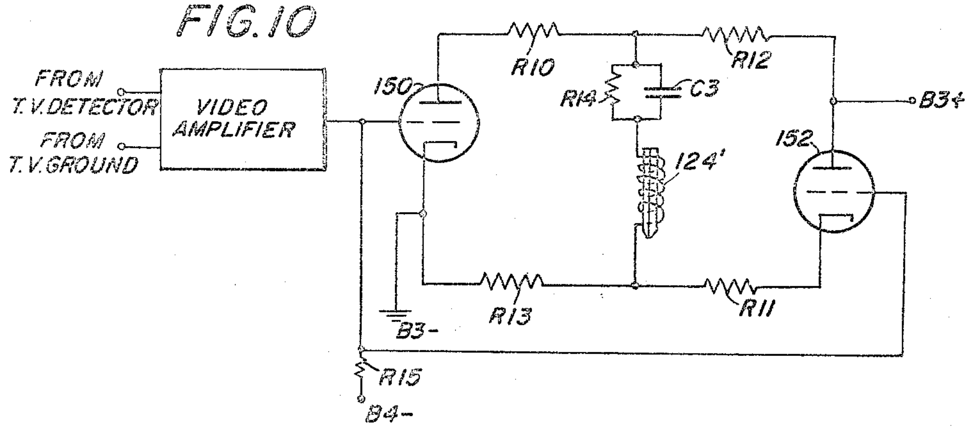

Referring to FIGURES 8, 9, and 10, the recorder picks up a signal at the output of the video detector where it has been rectified and filtered of the I.F. carrier. The recorder is preferably provided with its own video amplifier with circuits designed to give any desired pre-emphasis as in sound recorders to balance the response over the frequency range. The signal is put in the video amplifier. The output thereof is connected to a D.C. restorer, FIGURE 9, as required if the circuits of the video amplifier do not pass the D.C. component and so that the signal might also be picked up after any TV video amplifier as indicated by dash lines, FIGURE 8. In FIGURE 10 the D.C. restorer was omitted. The signal is next fed to a novel amplifier one form of which is shown in FIGURE 9 and another form in FIGURE 10.

Referring to FIGURE 9, the signal is then applied to the grid of tube 140. A voltage supply B1+ is connected to the plate of tube 140 through resistors R1 and R2. R1 being connected between B1+ and a junction point J1. The circuit of the head coils 124 and 125 is connected by segments 126 and 127 respectively engaging brushes 132 and 133 across points J1 and B2+ in series with an equalizing network represented by a condenser C1 and resistor R3 in parallel. B2+ has a potential equal to or less than B1+. Grid bias is provided for tube 140 across R4.

The input signal would probably vary from 0 to −75 volts. The zero voltage signal on the grid would represent a white picture in the TV cathode ray tube and −50 to −75 volts black. Tube 140 is fully conducting with zero grid volts and decreases in conductivity linearly from 0 to −75 volts. J1 is at a minimum potential for this point when tube 140 is fully conducting and maximum when tube 140 is nonconducting. The difference in potential between J1 at max. and min. can be adjusted by varying R1, R2, and B2+ so that the current through coils 124 and 125 can vary as desired. Adjustment can be made to give varying D.C., A.C. with a D.C. component, or pure A.C. Varying D.C. can thus be provided having the proper D.C. bias for recording. Or using an A.C. bias oscillator of high frequency the adjustment is made to provide A.C. alone.

The A.C. bias frequency should be several times the maximum recorded frequency. Since the tape takes at least a biasing frequency of 30,000 cy. recording 5000 cy.; the tape should take 6×4 mc.=24 mc. bias for recording 4 mc. Therefore an A.C. biasing oscillator is shown in block diagram with an adjustable resistor R5 to select the best biasing current. The oscillator's output circuit is tuned by a small capacitance C2 and inductance L to prevent shorting of the signal through the oscillator.

Referring to FIGURE 10, this circuit for driving the coils differs from the circuit in FIGURE 9 in that two tubes are used in place of 140 and a complete bridge circuit is formed. The bridge is formed by tube 150 in series with resistor R10 and tube 152 in series with resistor R11 in opposite legs of the bridge, the plate side ends of the legs of both tubes 150 and 152 connected together by a third leg containing resistor R12, and the cathode side ends of the legs connected together as the fourth leg containing resistor R13. The plate side of the leg of tube 152 is connected to voltage B3+ and the cathode side of the leg of tube 150 is grounded to B3−. Coil 124′ with equalizing circuit represented by C3 and R14 is connected as a bridge from the plate side of the leg containing tube 150 to the cathode end of the leg containing tube 152. The tubes are pentodes or triodes and have their grids connected to the input signal and biased to a negative potential B4− connected to the grids by a high resistance R15.

When the tubes are full conducting with zero grid voltage, for example, current flow is from B3+ to B3− through tube 152, R11, coil 124′, R10, and tube 150 in series. The tubes decrease in conductivity linearly as the grid voltage swings from 0 to −75 volts and as they do the potential across the bridge changes linearly. The polarity and potential across coil 124′ is determined for a given signal input according to the biasing of the grids, tube characteristics, and values selected for the resistors. The plate voltage is high enough to provide linear operation. Thus varying D.C., A.C. with a D.C. component, or pure A.C. can be provided. The proper values being selected according to whether A.C. or D.C. biasing is used as with the circuit in FIGURE 9

Steps in the process of recording and reproducing a signal are shown by reference to FIGURES 12 through 17.

Figure 12:
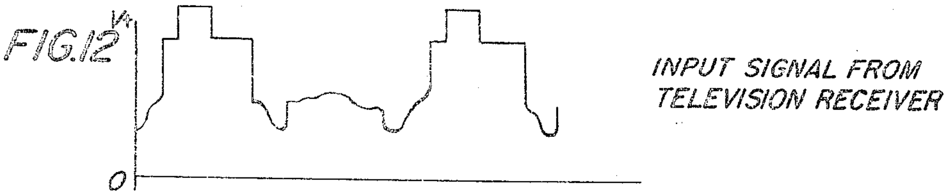
FIGURES 12 through 17 are curves representing the signal at successive points in the process of recording and reproducing.

FIGURE 12 shows a typical signal from the TV detector, not to scale.

Figure 13:
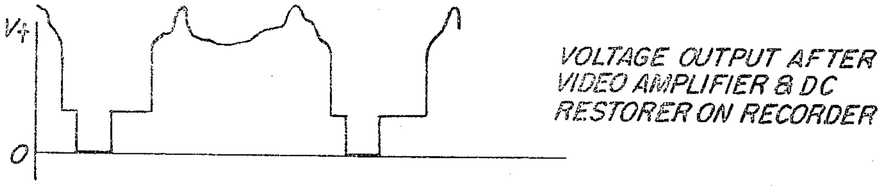

FIGURE 13 shows the output from an odd number of amplifier stages thus reversing the signal, the D.C. voltage component being restored by the D.C. restorer if it was missing at input or lost in the video amplifier.

Figure 14:
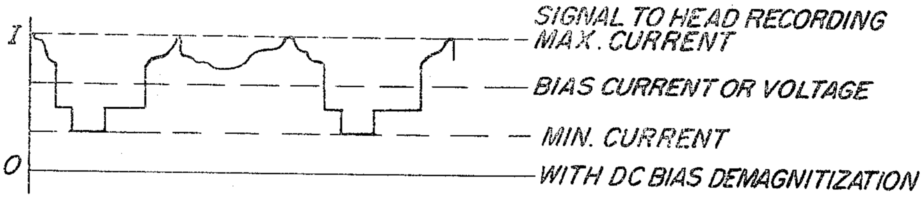

FIGURE 14 shows the signal as recorded with D.C. biasing, the polarity of the bias voltage being such as to reduce the magnetization left by the saturating erase magnet. If a minus voltage was used for biasing the tape the zero reference line would be at the top by an equal distance above the bias voltage line. The MAX. and MIN. lines represent the recording current at limits of linearity of recording on the magnetic medium.

Figure 15:
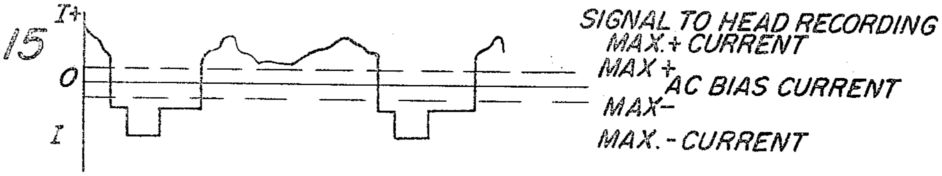

FIGURE 15 shows the signal with D.C. components removed ready for recording with A.C. biasing.

Figure 16:
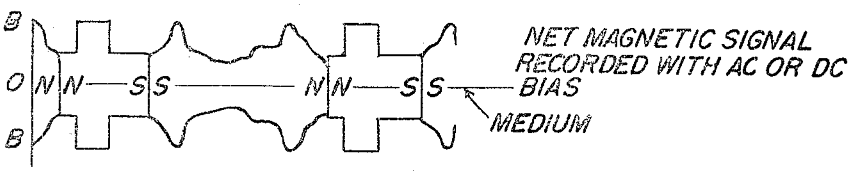

FIGURE 16 represents the net signal recorded with either A.C. or D.C. biasing. The flux lines are omitted for simplicity. The flux density is indicated by the distance the curve departs from the zero reference line. The flux lines if shown would loop from the vertical faces only. Lines through the zero reference represent complete reversal of the direction of magnetization as indicated by the letters N and S.

Figure 17:
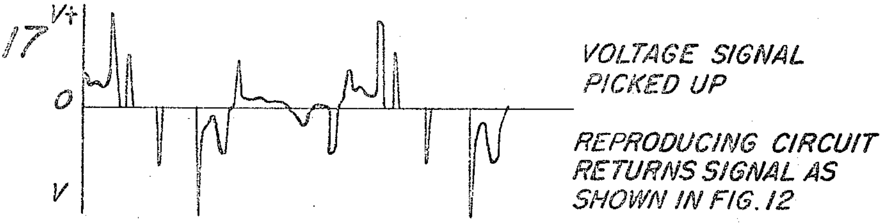

FIGURE 17 shows the signal voltage picked up by the coils. Each increase of magnetization in one direction induces a voltage of one polarity, and each decreases or reversal of magnetization therefrom induces a voltage of the opposite polarity in the coils. The intensity of this induced voltage in either case is proportional to the rate of change of flux linking with the coils.

Figure 11:
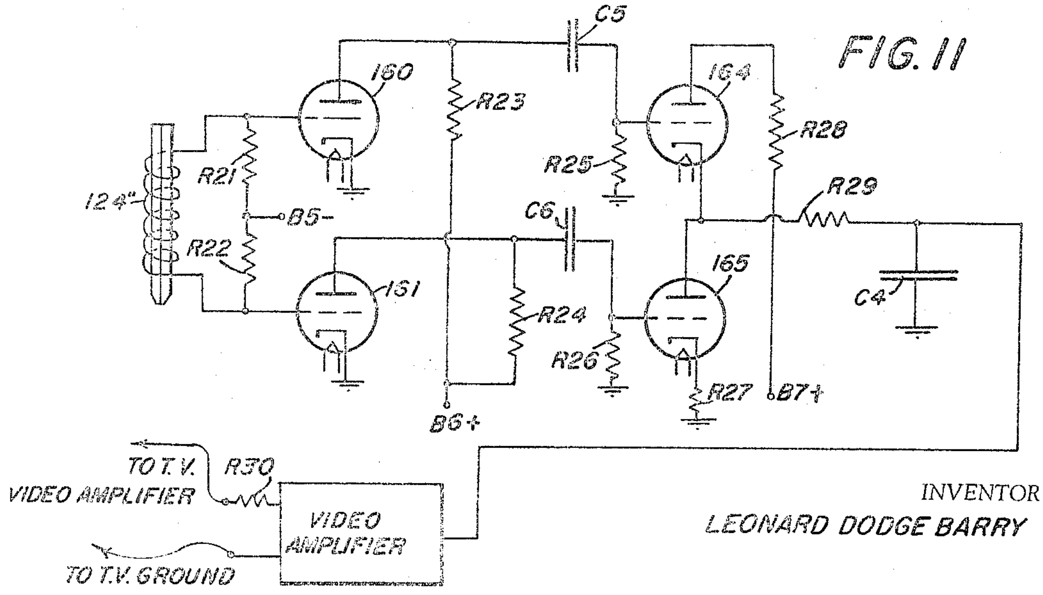
FIGURE 11 is a schematic and block diagram of the reproducing circuits.

The circuit shown in FIGURE 11 is a practical means developed to reproduce the original signal. This circuit receiving these intermittent voltages adds and subtracts charges in accordance with the voltage induced with reference to a linear rate of charging and discharging condenser C4. The amplifying portion of this circuit is assumed to be designed to supply post-emphasis.

Referring to this circuit, two similar tubes 160 and 161 are provided. One end of the pickup coil 124″ is connected to the grid of tube 160 and the other end connected to the grid of tube 161. Equally matched resistors R21 and R22 connected in series across the grids of tubes 160 and 161 provide a balanced grid bias voltage from a source of negative potential B5−. The cathodes of tubes 160 and 161 are grounded, and the plates are connected in series with equal resistances R23 and R24 respectively to B6+ voltage supply. The plates of tubes 160 and 161 are also connected to the grids of tubes 164 and 165 respectively in series with condensers C5 and C6 respectively. Grid leak bias is provided for tubes 164 and 165 by resistors R25 and R26 respectively. The cathode of tube 165 is grounded through R27 and the plate connected to the cathode of tube 164. The plate of tube 164 is connected in series with resistor R28 to a positive potential B7+. The plate of tube 165 is connected to condenser C4 in series with a current limiting resistor R29 to form an integrating circuit. The other side of C4 is grounded. The output across C4 is fed to the grid of a video amplifier providing if desired further post-emphasis from which the signal is returned to the TV ahead of its video amplifier as seen in FIGURE 8. The circuit connecting the recorders output to the TV has a high resistance R30 in series to prevent excessive current caused by improper connection or operation. The connecting leads should be fused where the recorder is to be a separate unit connected and disconnected from the TV set.

A voltage induced in coil 124″ will place opposite charges on the grids of tubes 160 and 161. The bias voltage supplied by B5− will be such that the tubes 160 and 161 will operate as class A amplifiers. When no signal is being received condensers C5 and C6 have equal charges and the biasing can be such that tubes 160 and 161 conduct. A signal will cause on tube to conduct more and the other less according to the polarity of the signal. The tube which conducts less increases the charge on its plate condensers and this increases the positive value of the grid of the associated tube 164 or 165 causing this tube to conduct if biased to cutoff with no signal or to conduct to a greater extent if not biased to that extent.

With a sufficiently high voltage applied at B7+, tube 164 conducts, charging the upper plate of capacitor C4 positive and the plate of tube 165 positive until tube 165 becomes conductive. A positive signal (reduction of negative charge) on the grid of tube 165 will cause conduction, reducing the positive charge on the upper plate of C4 and the cathode of tube 164 enabling tube 164 to be more readily conductive when its grid receives a positive charge, thus capacitor C4 gains and loses charges above and below its initial charge. The signal is algebraically integrated on condenser C4 in that both positive and negative charges are added thereon, the negative being subtracted from the positive.

Tubes 164 and 165 will be biased to the same point of conductivity with no signal and are preferably biased to cutoff with no signal. Thus when a signal increases the grid potential of tube 164 that tube conducts and increases the potential on C4. When a signal of reverse polarity is received this increases the grid potential of tube 165, and that tube conducts and decreases the potential on C4. Thus the charge on C4 can be added and subtracted. The circuit is balanced to add and subtract charges on condenser C4 on a linear basis, whereby the output voltage across C4 is proportional to $\int Edt$ of the applied signal voltage which will be pure A.C. as seen from FIGURE 17 and therefore balance out the signal charge on C4. The effect of a signal charge on C4 in influencing conductivity can be made negligible. The cathode of tube 165 can be connected to a negative potential below ground if this is found desirable to enable it to have a sufficient potential difference between plate and cathode to conduct.

The circuits for the sound are similar to present-day sound tape recorders and are therefore not shown.

When reproducing a recorded signal on a TV receiver the lines of recording are synchronized with the scanning of the tape by retarding the tape manually by applying a slight force to slipping clutch 84, FIGURES 1, 2, and 3, until the wheel 26 scans on the lines and not between lines if the recording was made with space between lines; otherwise this adjustment is not necessary. The magnetic head scanning wheel 26 should be free from wobble and vibration, and is held against axial movement as described so that the path of the magnetic heads therein will not vary beyond allowable tolerances.

Figure 18:
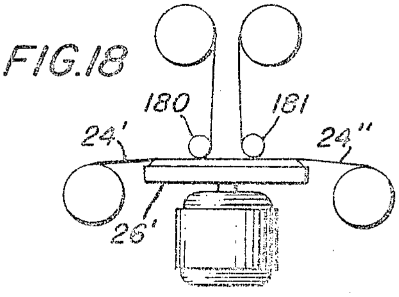
FIGURES 18 and 19 are schematic views of two alternative arrangements for scanning the tape.
Figure 19:
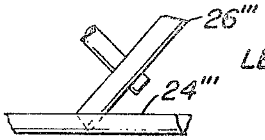

Two variations in the arrangement for scanning are shown in FIGURES 18 and 19. Other methods of scanning the tape with transverse movement include a reciprocating head or heads, and heads mounted on and moved by endless belt.

FIGURE 18 shows two tapes 24′ and 24″ being scanned by wheel 26′ the heads thereof being located on the side in a ring contacting the tapes and concentric with the axis of the wheel. The resulting transverse scan will be curved to the radius of the circle of the heads and will enable a slightly longer transverse line for a given width of tape than with the scanning wheel rotating perpendicular to the face and edge of the tape. The tape is flat when scanned. Rollers 180 and 181 hold the tapes 24′ and 24″ respectively against the heads on wheel 26′. Two or more tapes can be simultaneously scanned by one wheel and two or more recording and reproducing circuits provided. Some applications are the making of several recordings, the blending of pictures, or the quick change from one tape recording to another.

FIGURE 19 shows disk 26‴ scanning tape 24‴ at an angle. This inclined scanning is intermediate between the type of scanning shown in FIGURES 1 and 2 and that shown in FIGURE 18. The curvature of the tape is reduced as the angle of the wheel from perpendicular is increased.

Variations in the type of magnetic heads, the circuits for recording and reproducing, the contacts between the wheel and the stationary circuits and other variations may readily come to mind herewith. This recorder can be adapted to record sound or information at very slow tape and scanning wheel speed simply by providing a slow speed drive; for example, motor 60 could be replaced with a gear motor. This recorder can be developed for use in conjunction with a TV camera for recording pictures for later broadcast or for direct replay on individual TV receivers.

Magnetic tape is also called magnetic film especially when used in 16 and 35 mm. sizes. The word magnetic tape is herein meant to include magnetic film.

Although I have shown and described only one form of recorder, together with a few variations of the method of scanning, embodying my invention, it is understood that various changes, modifications, and adaptations may be made therein within the scope of the appended claims without departing from the spirit and scope of my invention.

What is claimed is:

1. In a magnetic tape recorder, at least one transducer unit, means serving to carry said unit for rotation, motor means rotating the unit at a constant speed, tape transport means for moving the tape from one side to the other of the plane of rotation of the unit, means for rendering said tape transport means operable and inoperable, guide means for said tape including guide block having a concave surface with a radius substantially the same as the scanning path of the transducer unit, said surface having a recess therein which extends along the scanning path of the rotating transducer unit, a projection on said guide block for supporting an edge of said tape to prevent transverse movement of said tape as a result of the movement of said transducer unit against said tape, means for mounting said guide block for movement from a position wherein the concave surface of said guide block maintains said tape in contact with the rotating transducer unit to a position spaced from the transducer unit, and means for maintaining said guide block in said first mentioned position when said tape transport means is rendered operable and in said second mentioned position when said tape transport means is rendered inoperable.

2. In a magnetic tape recorder as claimed in claim 1 wherein the mounting means pivotally mounts the guide block and a spring means is provided for biasing the guide block toward the transducer unit.

References Cited by the Examiner

UNITED STATES PATENTS

| | | | |
|---|---|---|---|
| 1,707,243 | 4/1929 | Wildhaber | 179—100.2 |
| 2,245,286 | 6/1941 | Marzocchi | 179—100.2 |
| 2,750,449 | 6/1956 | Thompson | 179—100.2 |
| 3,099,709 | 7/1963 | Barry | 274—11 |

BERNARD KONICK, *Primary Examiner.*

J. BREIMAYER, *Assistant Examiner.*